(12) United States Patent
Maurer

(10) Patent No.: US 12,111,184 B2
(45) Date of Patent: Oct. 8, 2024

(54) CONNECTING PIECE ASSEMBLY AND PROCESS CONTAINER

(71) Applicant: EDELSTAHL MAURER AG, Aesch (CH)

(72) Inventor: Emanuel Maurer, Aesch (CH)

(73) Assignee: EDELSTAHL MAURER AG, Aesch (CH)

( * ) Notice: Subject to any disclaimer, the term of this patent is extended or adjusted under 35 U.S.C. 154(b) by 166 days.

(21) Appl. No.: 17/786,369

(22) PCT Filed: Dec. 18, 2020

(86) PCT No.: PCT/EP2020/087054
§ 371 (c)(1),
(2) Date: Jun. 16, 2022

(87) PCT Pub. No.: WO2021/123191
PCT Pub. Date: Jun. 24, 2021

(65) Prior Publication Data
US 2023/0054482 A1    Feb. 23, 2023

(30) Foreign Application Priority Data

Dec. 19, 2019   (CH) ........................ 1668/19

(51) Int. Cl.
*G01D 11/30* (2006.01)
*B01J 19/00* (2006.01)

(52) U.S. Cl.
CPC .......... *G01D 11/30* (2013.01); *B01J 19/0053* (2013.01)

(58) Field of Classification Search
CPC ............................. G01D 11/30; B01J 19/0053
See application file for complete search history.

(56) References Cited

U.S. PATENT DOCUMENTS

2010/0230963 A1* 9/2010 Gayer ..................... F16B 2/10
285/415

FOREIGN PATENT DOCUMENTS

| DE | 3737914 A1 * | 5/1989 | |
| DE | 102012203355 A1 * | 9/2013 | ............. G01D 11/30 |
| EP | 0174417 A1 * | 3/1986 | |
| EP | 2278312 A1 * | 1/2011 | ........... G01N 27/283 |
| EP | 2568207 B1 * | 8/2018 | ............ F16L 19/065 |

OTHER PUBLICATIONS

International Search Report and Written Opinion issued Mar. 23, 2021 in Intl Appl. No. PCT/EP2020/087054.

* cited by examiner

Primary Examiner — Jamel E Williams
(74) Attorney, Agent, or Firm — MEDLER FERRO WOODHOUSE & MILLS PLLC

(57) ABSTRACT

Disclosed is a connecting piece assembly for a process connection of, in particular, fittings or sensors. The connection piece assembly having a first stationary connecting piece element and a second replaceable connecting piece element which is designed so as to be at least partly receivable by a receiving opening of the first stationary connecting piece element. The second replaceable connecting piece element has an outer thread for attaching a union nut of the fitting or the sensor. The connection piece assembly further includes at least one holding device which is designed to hold together the first stationary connecting piece element and the second replaceable connecting piece element. Also disclosed is a process container with a corresponding connecting piece assembly.

16 Claims, 3 Drawing Sheets

CONNECTING PIECE ASSEMBLY AND PROCESS CONTAINER

TECHNICAL FIELD

The invention relates to a connecting piece assembly according to the preamble of independent claim 1 and a process container having such a connecting piece assembly.

Such connecting piece assemblies with a stationary connecting piece element are regularly used in systems in the pharmaceutical, biotechnological, chemical and food industries, such as in tanks, boilers, reactors, pipelines and similar process containers.

BACKGROUND

The so-called Ingold connecting piece is commonly known as a standard connection for the installation of sensors or fittings in process containers. Ingold connecting pieces have a connecting piece element firmly welded into the container wall, which typically has a through-hole with an inner diameter of 25 mm or 40 mm and a tolerance H7 ("25H7" or "40H7"). The through-hole receives the sensor or fitting, which is screwed to an outer thread of the Ingold connecting piece, facing away from the process, with a union nut on the sensor or fitting base.

However, the known Ingold connecting pieces have a significant safety risk in that, if the fitting is removed while the process pressure in the process container is still present, the O-ring responsible for the seal on the fitting seals with the inner wall of the through-hole until the end while it is being pulled out of the through-hole. This can result in the fitting suddenly being flung away like a bullet when the union nut is finally loosened and the process medium escapes under pressure from the open through-hole with possibly serious consequences. For reducing this safety risk, safety Ingold connecting pieces are also known, for example, from DE 10 2012 203 355 B4, in which the process pressure is first reduced before the union nut is completely loosened.

In addition, the installation and removal or replacement of the individual fittings or sensors frequently results in unwanted deformation or damage to the 25H7 or 40H7 inner diameter or the through-hole or the connecting piece edge of welded-in Ingold connecting pieces. This can mean that the fittings or sensors can no longer be properly connected or that the tightness of the connection is at risk, which can result in considerable difficulties, in particular in the case of aseptic process containers. In order to prevent or counteract these difficulties, the damaged connecting piece element must typically be cut out and replaced with a new, undamaged welded-in connecting piece element. This is often technically demanding, requiring a skilled installer, and disrupts the operation of the process container for a relatively long period of time.

Furthermore, if connecting piece elements are welded in, the shape of the inner diameter or of the through-hole changes in an undesirable manner, which usually entails checking the round shape of the through-hole with a specific measuring tool. In order to counteract such changes, the connecting piece elements are often provided with a slight undersize, for example, an inner diameter of 24.8 mm or 39.8 mm, and after welding are reamed to 25H7 or 40H7 with a specific tool such as a reamer. This in turn entails additional effort and in turn requires specifically trained personnel. With such a reaming, it is typically also not possible to achieve a preferably smooth surface of the through-hole.

In addition, with the known connecting piece elements, product contamination sometimes also occurs due to a damaged or loose nut or due to abrasion, for example, of seals, which gets into the process container. This can pose significant difficulties in ensuring aseptic conditions.

Therefore, the problem addressed by the present invention is that of proposing a connecting piece assembly which has improved process reliability, which can ensure a comparatively precise geometry, which can be produced efficiently and which allows for safe and simple handling or maintenance.

SUMMARY

According to the invention, the problem is solved by a connecting piece assembly as defined in independent claim 1 and by a process container as defined in independent claim 13. Advantageous design variants of the invention can be found in the dependent claims.

The essence of the invention is as follows: A connecting piece assembly for a process connection of in particular fittings or sensors comprises a first stationary connecting piece element and a second replaceable connecting piece element which is designed so as to be at least partly receivable by a receiving opening of the first stationary connecting piece element. The second replaceable connecting piece element has an outer thread for attaching a union nut of the fitting or the sensor. Furthermore, the connecting piece assembly comprises at least one holding device or clamping device, which is designed to hold together the first stationary connecting piece element and the second replaceable connecting piece element.

In the context of the present invention, the term "stationary" generally denotes a fixed or non-detachable connection of the first connecting piece element to a process container. A connection is considered non-detachable if it can only be separated again by damaging or destroying the connected parts or the respective connection element. The first connecting piece element is usually welded to the process container and is thus stationary.

In connection with the invention, the term "replaceable" generally denotes a detachable connection in which the corresponding connection element does not have to be damaged or destroyed in order to release the connection. In other words, the second connecting piece element can be removed/released from, or inserted into, the first connecting piece element essentially without great effort and without the use of a tool when the holding device is removed.

In the present case, the term "holding together" refers to an interlocking and/or force-locking fit of the at least one holding device relative to the first and the second connecting piece element. For example, depending on the design of the connecting structure between the first stationary and the second replaceable connecting piece element, one, two or more holding devices, such as holding rings, clamping rings, clamping hooks, pipe holding clamps, manual tensioning devices and/or spring clamps can be provided.

If fittings or sensors on process containers are replaced, which is regularly necessary in practice to control various process parameters, the connecting piece assembly according to the invention makes it possible to ensure that no forces large enough to cause damage or deformation of the connecting piece element have to be exerted on said connecting piece element firmly attached to the container. The at least one holding device allows the first and the second connecting piece element to be held together securely and in an easily releasable manner.

Due to the multi-part structure of the connecting piece assembly according to the invention, which can be assembled or clamped and, in addition, is preferably interlockingly connectable, the import of detached parts such as assembly nuts and contamination such as abrasion from seals into the process container can also be effectively prevented. If necessary, the second connecting piece element can also be replaced in a simple manner without having to remove the first connecting piece element from the process container. This replacement can be achieved without tools by releasing the holding device, removing the damaged or impaired second connecting piece element, inserting a new undamaged second connecting piece element and retensioning the holding device. Specific assembly or expert knowledge is not required or only to a minor extent. This replacement can also take place comparatively quickly, so that interruptions in operation can be greatly reduced or even prevented.

Due to the insertability of the second connecting piece element, it can also be prevented that the geometry of the through-hole, such as a 25H7 or a 40H7 geometry, is impaired. It is not necessary to ream the second connecting piece element after it has been installed, which can further reduce the installation effort and the installation time. Since the second connecting piece element can be manufactured with the virtually perfect inner geometry, the surface of the through-hole can also be dimensioned extremely precisely and designed to be smooth. For example, it can be honed. The precise dimensioning or shaping of the second connecting piece element makes it possible to ensure reliable tightness and a virtually 100% roundness of the through-hole.

The connecting piece assembly and in particular its second connecting piece element can be designed as an Ingold connecting piece and in particular as a safety Ingold connecting piece. Such Ingold connecting pieces can be advantageous for many process containers and the fittings and sensors used therein. Among other things, they allow for an efficient and tight installation or removal of sensors and fittings in a standardized manner.

Preferably, the first stationary connecting piece element is provided with a circumferential flange. In particular, the first connecting piece element can be designed as a so-called TC connecting piece in accordance with the German Industry Standard (DIN) 32676. Such a first connecting piece element makes it possible, if necessary, to connect another component, for example, a fitting or a sensor, directly to the first connecting piece element as an alternative to the second connecting piece element. This component can be attached to the first connecting piece element with the holding device or in some other way.

The second replaceable connecting piece element preferably has a circumferential flange which preferably comprises at least one projection or at least one recess which forms an interlocking connection with at least one opposite recess or with at least one opposite projection of a circumferential flange of the first stationary connecting piece element. In this way, an optimal mounting structure can be created for the holding device, so that a particularly good clamping effect can be achieved. In addition, the interlocking connection prevents a movement transverse to the connecting piece axis, which can offer considerable advantages, in particular in the case of a horizontal or slanted alignment of the connecting piece axis. The projection and the corresponding recess can be designed to be continuous, but two or more individual projections and recesses spaced apart from one another, which are designed to correspond to one another, can also be provided. The protrusion and the recess can allow for a tongue-and-groove connection of the two circumferential flanges of the first and second connecting piece elements.

Preferably, the circumferential flange of the first stationary connecting piece element and the circumferential flange of the second stationary connecting piece element each have a bevel, so that the assembled flange tapers outward in the assembled state. As a result, the fit of the holding device and thus its clamping effect can in turn be further improved.

The holding device of the connecting piece assembly can be designed as a clamping device. For this purpose, it preferably encloses the flange of the first stationary connecting piece element and the flange of the second replaceable flange element in a clamping manner and firmly presses the two components together. The operational reliability of the connecting piece assembly can be further increased by means of this measure.

The receiving opening of the first stationary connecting piece element preferably comprises an inlet opening which is designed such that a fitting or a sensor can be guided through it. The inlet opening is preferably provided in the bottom of the first stationary connecting piece element on the side of the process and forms the passage through the wall of the process container.

Preferably, the second replaceable connecting piece element comprises a through-hole which corresponds to the inlet opening of the first stationary connecting piece element. This ensures a secure insertion of the fitting or the sensor into the process container.

Preferably, the through-hole of the second replaceable connecting piece element has a beveled transition region between a bore portion with a larger inner diameter and a bore portion with a smaller inner diameter, wherein the bore portion with the smaller inner diameter adjoins the inlet opening of the first stationary connecting piece element in a flush manner. Preferably, the smaller inner diameter is 25 mm with a tolerance of H7 or 40 mm with a tolerance of H7. This is the norm with regard to a use as an Ingold connecting piece. The larger inner diameter is then preferably about 27 mm. Such a design results in a safety function which ensures that, if the fitting or the sensor is removed and the union nut is unscrewed accordingly, the fitting or the sensor is slowly lifted out of the through-hole of the second replaceable connecting piece element.

The O-ring of the fitting or sensor, which regularly seals with the inner wall of the through-hole in a radial manner, migrates from the sealing region (25H7 or 40H7 inner diameter) to the connection region expanded in the inner diameter. Any excess pressure and process medium can now escape around the O-ring which no longer seals against the inner wall of the through-bore lying further outside. However, since the union nut of the sensor or fitting base is at this point in time still screwed onto the outer thread of the second replaceable connecting piece element and the thread also acts like a throttling labyrinth, excess pressure and/or the process medium can escape in a controlled manner, so that they no longer pose a particularly high risk. The operator thus notices in good time that there is still excess pressure in the system and can, if necessary, retighten the union nut, so that the process is sealed again.

Preferably, the outer diameter of the part of the second replaceable connecting piece element received by the first stationary connecting piece element is smaller than the inner diameter of the receiving opening of the first stationary connecting piece element. By means of this design, it can be ensured that a sealing element or a part of a sealing element can also be introduced between the outer wall of the second replaceable connecting piece element and the inner wall of the first stationary connecting piece element.

An annular sealing element is preferably arranged, at least partially, in the annular gap between the first stationary connecting piece element and the second replaceable connecting piece element. The annular sealing element preferably forms a seat for the second replaceable connecting piece element, wherein, in the mounted state, it also surrounds the side walls of the second replaceable connecting piece element in a sealing manner, at least in the lower region. Further preferably, the annular sealing element has a circumferential bead, which is received in a sealing manner by corresponding grooves on the underside of the second replaceable connecting piece element and in the receiving bottom of the first stationary connecting piece element. By means of the design of the annular sealing element described above, an extremely effective seal can be created between the first stationary connecting piece element and the second replaceable connecting piece element, so that in particular no process medium can escape between the two components.

Another aspect of the invention relates to a process container with at least one connecting piece assembly as described above and optionally a fitting or a sensor. In this case, the first stationary connecting piece element is welded into a wall of the process container.

With the process container according to the invention, the advantages and effects described above in connection with the connecting piece assembly according to the invention and its preferred embodiments can be realized in practice in an efficient manner.

A snap ring is preferably arranged at an end of the fitting or the sensor facing its base, by means of which the fitting or the sensor is pushed back when the union nut is unscrewed. This measure serves the safety function described above, since the fitting or the sensor can now be pushed back in a controlled manner.

Preferably, the first stationary connecting piece element has an upward incline (slope) of about 15% with respect to a perpendicular to the container wall. Connecting piece assemblies as they are the subject matter of the present invention are designed both for straight and for oblique installation. Oblique installation is regularly used for vertically running walls in process containers. Since most liquid-based electrochemical sensors require installation with a slope of 15°, the first stationary connecting piece element is beveled accordingly in its connection region on the side of the process. The resulting oblique position of the sensor is used with liquid-based sensors, for example, for pH measurement, to avoid air bubbles in the sensor tip.

BRIEF DESCRIPTION OF THE DRAWINGS

Further advantageous designs of the invention can be found in the following description of embodiments of the invention with reference to the schematic drawings. In particular, the connecting piece assembly according to the invention is described in detail below with reference to the accompanying drawings using embodiments.

DETAILED DESCRIPTION

Figure 1:
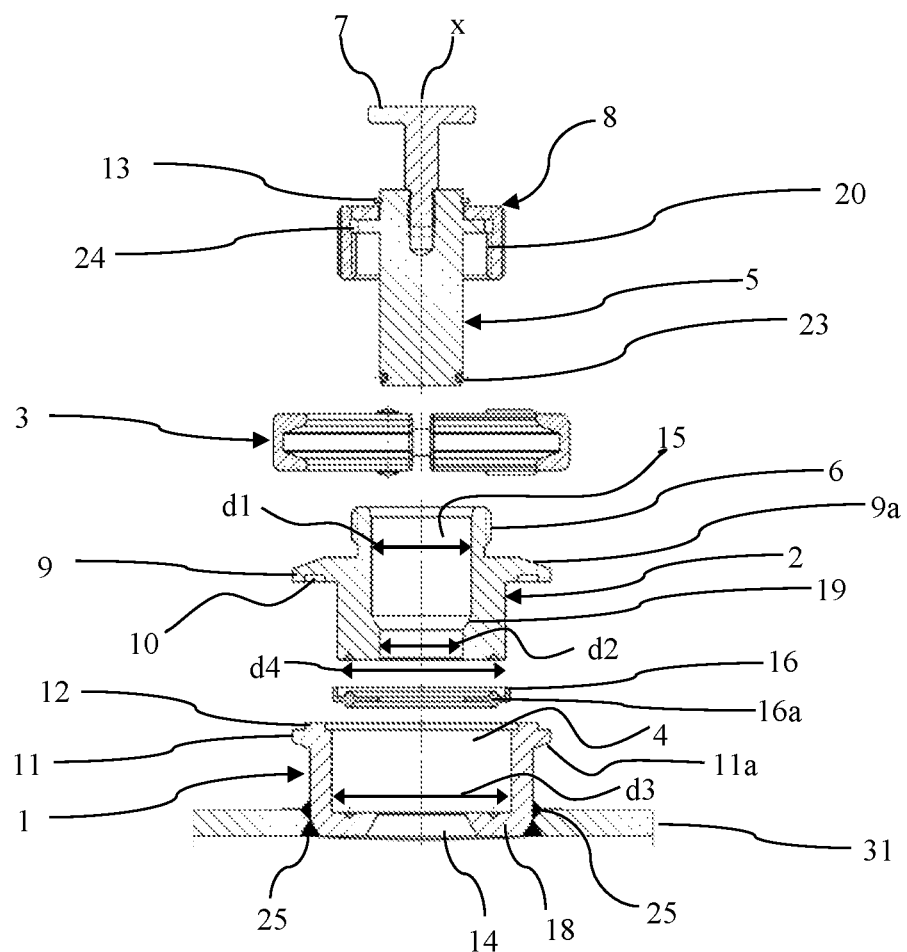
FIG. 1 is an exploded view of a connecting piece assembly according to the invention and a fitting with a union nut in cross section.

Certain terms are used in the following description for practical reasons and are not intended to be limiting. The words "right," "left," "below" and "above" indicate directions in the drawing to which reference is made. The terms "inward," "outward," "below," "above," "left," "right" or similar terms are used to describe the arrangement of designated parts relative to one another, the movement of designated parts relative to one another and the directions towards or away from the geometric center of the invention and designated parts thereof as shown in the figures. These spatial relative specifications also comprise positions and orientations other than those shown in the drawings. For example, if a part shown in the figures is turned over, elements or features that are described as "below" are consequently "above." The terminology comprises the words expressly mentioned above, derivatives thereof, and words of similar meaning.

In order to avoid repetitions in the figures and the associated description of the different aspects and embodiments, specific features are to be understood as common for different aspects and embodiments. The omission of an aspect in the description or a figure does not suggest that this aspect is missing in the associated embodiment. Instead, such an omission can serve the clarity and prevent repetitions. In this context, the following specification applies to the entire further description: If reference signs are included in a figure for the sake of clarity of the figure, but are not mentioned in the directly associated description text, reference is made to the explanation thereof in the preceding description of the figures. If reference signs are also mentioned in the description text belonging directly to a figure which are not contained in the associated figure, reference is made to the preceding and following figures. Similar reference signs in two or more figures denote similar or identical elements.

FIG. 1 illustrates a connecting piece assembly according to the invention comprising a first stationary connecting piece element 1, a second replaceable connecting piece element 2 and a holding device designed as a clamping device 3 in a disassembled state together with an exemplary fitting 5 which is to be guided through the connecting piece assembly.

The first stationary connecting piece element 1 is welded into the wall 31 of a process container (not depicted), which is illustrated by the weld joints 25. The first stationary connecting piece element 1 has a receiving opening 4 with an inner diameter d3. Furthermore, the first stationary connecting piece element 1 comprises a receiving bottom 18 which in turn defines an inlet opening 14 which allows access to the interior of the process container. The inlet opening 14 preferably widens in the direction of the inner side of the process container. The wall thickness of the receiving bottom 18 essentially corresponds to the wall thickness of the wall 31. At its upper end, the first stationary connecting piece element 1 has a circumferential flange 11 which comprises a continuous projection 12 on its upper side. The flange 12 has an outward-facing bevel 11*a* on its underside.

Furthermore, an annular sealing element 16 with a bead 16*a* is provided, which can be introduced into the receiving opening 4 and is received by the receiving bottom 18. The annular sealing element 16 is used to seal against the second replaceable connecting piece element 2. The latter is received at least in its lower region by the receiving opening 4 of the first stationary connecting piece element 1. In this case, it regularly has an outer diameter d4 which is smaller than the inner diameter d3 of the receiving opening 4. There is preferably some play between the received region of the second replaceable connecting piece element 2 and the inner wall of the first stationary connecting piece element 1.

The second replaceable connecting piece element 2 further comprises a circumferential flange 9, on the underside of which a continuous recess 10 is introduced which corresponds to the projection 12 on the upper side of the flange 11 of the first stationary connecting piece element 1 in an interlocking manner. The flange 9 has an outward-facing bevel 9*a* on its upper side. Above the flange 9, the second replaceable connecting piece element 2 has an outer thread 6 which is intended to interact with a corresponding inner thread 20 of a union nut 8 of a fitting or a sensor 5 to be fastened.

The second replaceable connecting piece element 2 comprises a through-hole 15 which comprises an upper region with an inner diameter d1 and a lower region with an inner diameter d2. The inner diameter d1 is dimensioned somewhat larger than the inner diameter d2. A corresponding transition bevel 19 is provided between the two regions. This design is used for the safety function, explained in the general part of the description, against premature and possibly uncontrolled loosening of the union nut 8, i.e., when there is still excess pressure in the system. The inner diameter d2 is regularly 25 mm with a tolerance of H7 or 40 mm with a tolerance of H7 (i.e., when used as an Ingold connecting piece). The inner diameter d1 is then about 27 mm. Furthermore, the through-hole 18 is flush with the inlet opening 14 or its upper side facing away from the process.

The fitting 5 comprises a base 24 to which the union nut 8 is attached. A snap ring 13 is provided at the upper end of the fitting 5, via which the fitting 5 is pushed back when the union nut is unscrewed. The O-ring 23 arranged at the lower end of the fitting 5 then leaves the region of the through-hole 15 with the (smaller) inner diameter d2, so that there is no longer any sealing effect and excess pressure or process medium can escape in a controlled manner, if necessary. In the upper side of the fitting, a handle part 7 is introduced, by means of which the fitting 5 can be moved.

The clamping device 3 is used to securely hold together the first stationary connecting piece element 1 and the second replaceable connecting piece element 2 in the region of the bevels 9*a* and 11*a* of the two flanges 9 and 11. Finally, the longitudinal axis of the fitting 5 is denoted by x.

Figure 2:
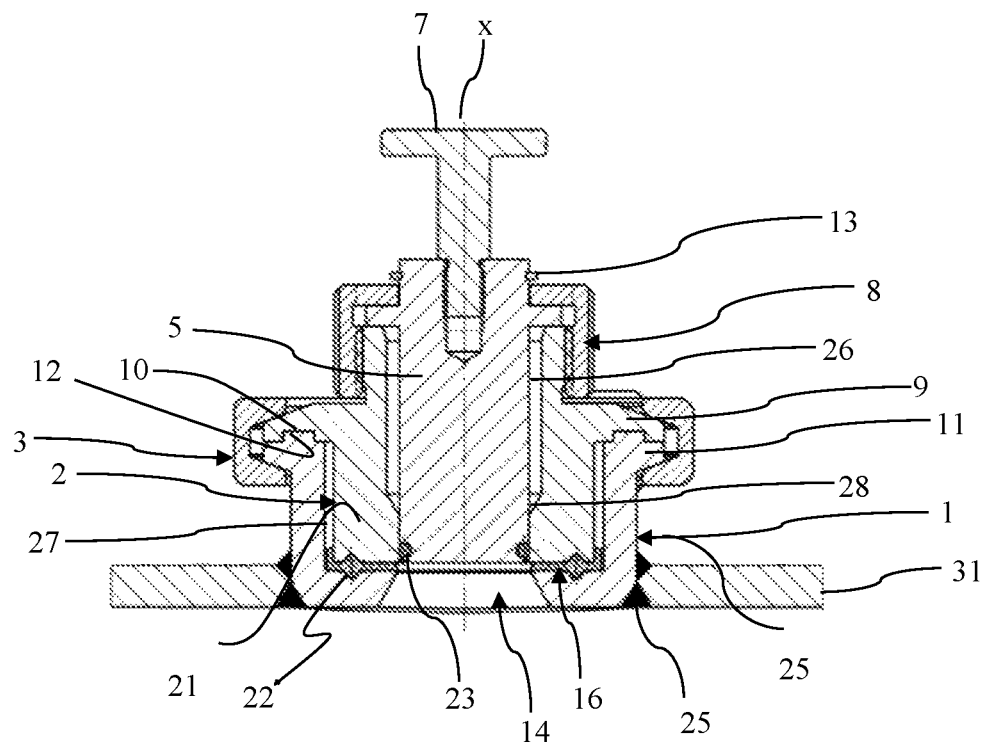
FIG. 2 is a cross-sectional view of a connecting piece assembly according to the invention in the assembled state with inserted fitting and screwed-on union nut.

FIG. 2 illustrates the connecting piece assembly according to the invention and the fitting 5 in the assembled state.

It can be seen that the flange 11 of the first stationary connecting piece element 1 and the flange 9 of the second connecting piece element 2 now engage in an interlocking manner, i.e., the flange 9 rests on the flange 11 and the projection 12 of the flange 11 engages in an interlocking manner in the recess 10 of the flange 9. From the outside, the two flanges 9 and 11 are held together or pressed together by the clamping device 3, wherein the above-described bevels 9*a* and 11*a* of the two flanges 9 and 11 ensure an optimal clamping fit of the clamping device 3.

An annular gap 26 is formed between the fitting 5 and the second replaceable connecting piece element 2 in the region of the through-hole 15, which is due to the different inner diameters d1 and d2 of the through-hole 15 (cf. FIG. 1 above). The O-ring 23 of the fitting 5 lies in this case still below the transition bevel 19 and thus seals off the through-hole 15 from the inlet opening 14. It can also be seen that the bead 16*a* of the annular sealing element 16 is now received by the groove 21 in the underside of the second replaceable connecting piece element 2 and by the groove 22 in the receiving bottom 18 of the first stationary connecting piece element 1, thus creating a particularly effective seal between the first stationary connecting piece element 1 and the second replaceable connecting piece element 2. In a way, the annular sealing element 16 acts as a seat for the second replaceable connecting piece element 2. It therefore preferably also partially extends into the annular gap 27 formed between the second replaceable connecting piece element 2 and the inner side of the first stationary connecting piece element 1.

Figure 3:
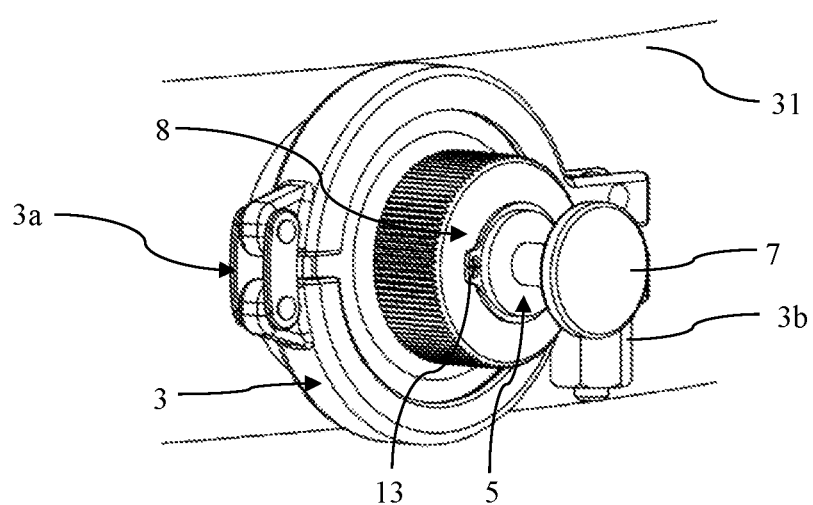
FIG. 3 is a perspective external view of a connecting piece assembly according to the invention in the assembled state with inserted fitting (or sensor) and screwed-on union nut.

FIG. 3 is a perspective view of a fitting 5 (or sensor) mounted in a container wall 31 by means of a connecting piece assembly according to the invention. In particular, it shows the hinge unit 3*a* of the clamping device 3 and the corresponding tightening screw 3*b*, via which the contact pressure to be exerted on the flanges can be adjusted. The snap ring 31 is arranged at the upper end of the fitting or the sensor 5, i.e., slightly above the upper side of the union nut 8. The handle part 7 protrudes outwardly from the fitting 5.

Figure 4:
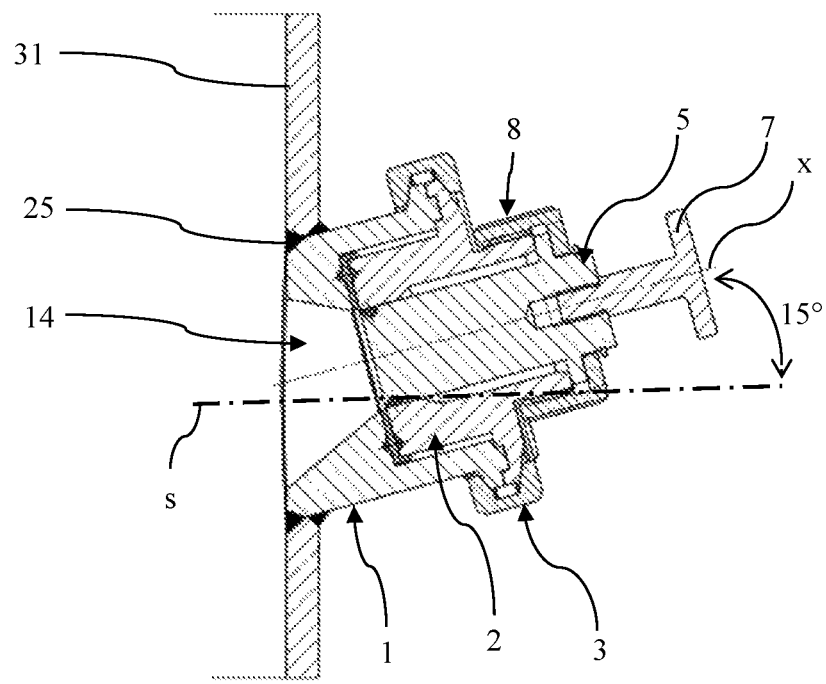
FIG. 4 is a cross-sectional view of a connecting piece assembly according to the invention with inserted fitting (or sensor) and screwed-on union nut in the obliquely mounted state.

A preferred, obliquely upward-facing installation position of the connecting piece assembly according to the invention and the fitting or the sensor 5 is illustrated with reference to FIG. 4. As can be seen, a perpendicular s to the container wall 31 encloses an angle of 15° with the longitudinal axis x of the fitting or of the sensor 5. This is also referred to as a slope of 15°. The first stationary connecting piece element 1 and its inlet opening 14, which widens towards the inner side of the process container, are geometrically adjusted to this installation position in a corresponding manner. The advantages of such an oblique position have already been explained above in the general description. Otherwise, however, nothing changes with regard to the functionality of the connecting piece assembly according to the invention.

Figure 5:
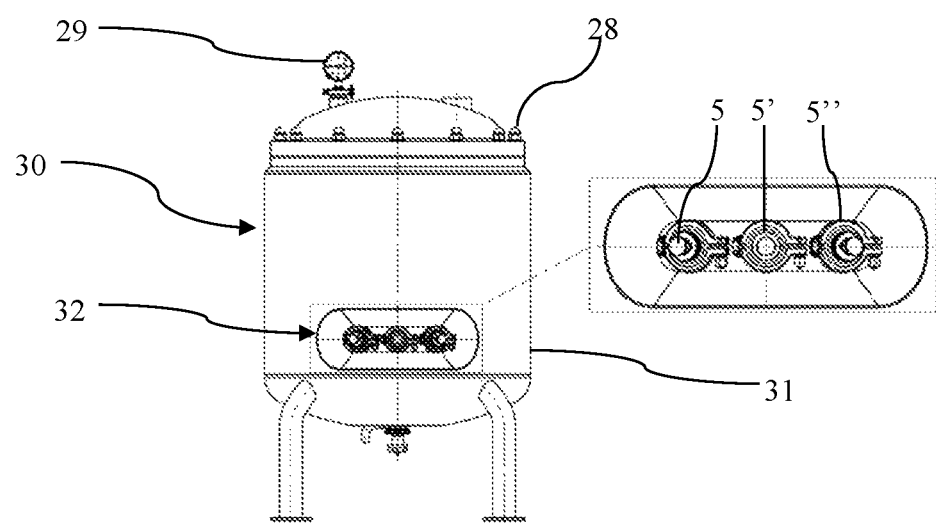
FIG. 5 shows a process container according to the invention with three obliquely mounted connecting piece assemblies with inserted fitting and screwed-on union nut.

Finally, FIG. 5 shows a process container 30 according to the invention with a connection region 32 provided in the container wall 31 for a plurality (in this case, three) possibly different fittings or sensors 5, 5', 5". For example, these can be sensors or probes for a pH measurement, a temperature measurement, an oxygen or a CO2 measurement, or the like.

For example, a pressure indicator 29 is arranged on the lid of the process container 31. The screw connection 28 of the lid can also be seen.

Even though the invention is illustrated and described in detail by means of the drawings and the associated description, this illustration and this detailed description are to be understood as illustrative and exemplary and not as limiting the invention. In order not to transfigure the invention, in certain cases well-known structures and techniques cannot be shown and described in detail. It is understood that persons skilled in the art can make changes and modifications without departing from the scope of the following claims. In particular, the present invention covers further embodiments with any combination of features that may differ from the combinations of features explicitly described.

The present disclosure also comprises embodiments with any combination of features mentioned or shown above or below for different embodiments. It also comprises individual features in the drawings, even if they are shown therein in connection with other features and/or are not mentioned above or below. The alternatives of embodiments and individual alternatives of the features thereof that are described in the drawings and the description can also be excluded from the subject matter of the invention or from the disclosed subjects. The disclosure comprises embodiments that only include the features described in the claims or in the embodiments and also those that comprise additional other features.

Furthermore, the term "comprise" and derivatives thereof does not exclude other elements or steps. The indefinite article "a" or "an" and derivatives thereof does also not exclude a plurality. The functions of a plurality of features listed in the claims can be fulfilled by a unit or a step. The mere fact that certain measures are listed in different dependent claims does not mean that a combination of those measures cannot be used advantageously. The terms "essentially," "about," "approximately" and the like in connection with a property or a value in particular also define exactly the property or exactly the value. The terms "about" and "approximately" in connection with a given numerical value or range can refer to a value or range which lies within 20%, within 10%, within 5% or within 2% of the given value or range. All reference signs in the claims are not to be understood as limiting the scope of the claims.

LIST OF REFERENCE SIGNS

1 First stationary connecting piece element
2 Second replaceable connecting piece element
3 Clamping device
3a Hinge unit
3b Tightening screw
4 Receiving opening (first stationary connecting piece element)
5 Fitting/sensor
6 Outer thread (second replaceable connecting piece element)
7 Handle part
8 Union nut
9 Circumferential flange (second replaceable connecting piece element)
9a Bevel
10 Recess
11 Circumferential flange (first stationary connecting piece element)
11a Bevel
12 Projection
13 Snap ring
14 Inlet opening
15 Through-hole (second replaceable connecting piece element)
16 Annular sealing element
16a Bead
17 Circumferential bead
18 Receiving bottom (first stationary connecting piece element)
19 Transition bevel (d1/d2)
20 Inner thread union nut
21 Groove underside (second replaceable connecting piece element)
22 Groove receiving bottom (first stationary connecting piece element)
23 O-ring sensor/fitting
24 Base fitting/sensor
25 Weld joints
26 Annular gap (through-hole/fitting)
27 Annular gap (receiving opening/second replaceable connecting piece element)
28 Screw connection process container lid
29 Pressure indicator
30 Process container
31 Container wall
32 Connection region
s Perpendicular to the container wall
x Longitudinal axis (fitting/sensor)
d1 Larger inner diameter through-hole
d2 Smaller inner diameter through-hole
d3 Inner diameter receiving opening
d4 Outer diameter (received part of second replaceable connecting piece element)

What is claimed is:

1. A connecting piece assembly for a process connection of in a fitting or a sensor, the connecting piece assembly comprising:
    a first stationary connecting piece element;
    a second replaceable connecting piece element configured to be at least partly receivable by a receiving opening of the first stationary connecting piece element, wherein the second replaceable connecting piece element has an outer thread for attaching a union nut of the fitting or the sensor; and
    at least one holding device configured to hold together the first stationary connecting piece element and the second replaceable connecting piece element,
    wherein the second replaceable connecting piece element has a circumferential flange comprising a projection or a recess which forms an interlocking connection with an opposite recess or an opposite projection of another circumferential flange of the first stationary connecting piece element.

2. The connecting piece assembly according to claim 1, wherein the circumferential flange of the first stationary connecting piece element and the circumferential flange of the second stationary connecting piece element each have a bevel, so that the assembled flange tapers outward in the assembled state.

3. The connecting piece assembly according to claim 1, wherein the holding device is designed to enclose in a clamping manner and press together the flange of the first stationary connecting piece element and the flange of the second replaceable connecting piece element.

4. The connecting piece assembly according to claim 1, wherein the receiving opening of the first stationary connecting piece element comprises an inlet opening which is designed such that the fitting or the sensor can be guided through it.

5. The connecting piece assembly according to claim 2, wherein the second replaceable connecting piece element has a through-hole which corresponds with the inlet opening of the first stationary connecting piece element.

6. The connecting piece assembly according to claim 5, wherein the through-hole of the second replaceable connecting piece element has a beveled transition region between a bore portion with a larger inner diameter and a bore portion with a smaller inner diameter, wherein the bore portion with the smaller inner diameter adjoins the inlet opening of the first stationary connecting piece element in a flush manner.

7. The connecting piece assembly according to claim 6, wherein the smaller inner diameter is 25 mm with a tolerance of H7 or 40 mm with a tolerance of H7.

8. The connecting piece assembly according to claim 1, wherein an outer diameter of a part of the second replaceable connecting piece element received by the first stationary connecting piece element is smaller than an inner diameter of a receiving opening of the first stationary connecting piece element.

9. The connecting piece assembly according to claim 1, wherein an annular sealing element is arranged between the first stationary connecting piece element and the second replaceable connecting piece element.

10. The connecting piece assembly according to claim 9, wherein the annular sealing element forms a seat for the second replaceable connecting piece element, wherein, in the mounted state, it also surrounds the side walls of the second replaceable connecting piece element in a sealing manner, at least in the lower region.

11. The connecting piece assembly according to claim 9, wherein the annular sealing element has a circumferential bead which is received in a sealing manner by corresponding grooves on an underside of the second replaceable connecting piece element and a receiving bottom of the first stationary connecting piece element.

12. A process container having at least one connecting piece assembly according to claim 1, and a fitting or a sensor, wherein the first stationary connecting piece element of the connecting piece assembly is welded into a wall of the process container.

13. The process container according to claim 12, wherein a snap ring is arranged at an end of the fitting or the sensor facing its base, by means of which the fitting or the sensor is pushed back when the union nut is unscrewed.

14. The process container according to claim 12, wherein the first stationary connecting piece element has an upward incline of about 15% with respect to a perpendicular to the wall of the process container.

15. The process container according to claim 12, wherein the projection mates with the opposite recess to form the interlocking connection.

16. A connecting piece assembly for a process connection of a fitting or a sensor, the connecting piece assembly comprising:
a first stationary connecting piece element;
a second replaceable connecting piece element configured to be at least partly receivable by a receiving opening of the first stationary connecting piece element, wherein the second replaceable connecting piece element has an outer thread for attaching a union nut of the fitting or the sensor; and
at least one holding device configured to hold together the first stationary connecting piece element and the second replaceable connecting piece element,
wherein the second replaceable connecting piece element has a circumferential flange comprising a projection or a recess configured to directly engage an opposite recess or an opposite projection of another circumferential flange of the first stationary connecting piece element.

* * * * *